US008612129B2

(12) United States Patent
Gagliardi et al.

(10) Patent No.: US 8,612,129 B2
(45) Date of Patent: Dec. 17, 2013

(54) MARINE THREAT MONITORING AND DEFENSE SYSTEM

(75) Inventors: Joseph R. Gagliardi, Katy, TX (US); Des Flynn, Edinburgh (GB); John Grant, Livingston (GB)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 13/477,733

(22) Filed: May 22, 2012

(65) Prior Publication Data

US 2012/0316769 A1 Dec. 13, 2012

Related U.S. Application Data

(60) Provisional application No. 61/488,879, filed on May 23, 2011.

(51) Int. Cl.
*G01S 13/00* (2006.01)
*G05D 1/02* (2006.01)

(52) U.S. Cl.
USPC .............................. 701/300; 701/301; 342/41

(58) Field of Classification Search
USPC .................... 701/21, 300, 301; 342/454–456, 342/357.21, 41, 90, 385, 386, 46, 47
See application file for complete search history.

(56) References Cited

U.S. PATENT DOCUMENTS

| | | | | |
|---|---|---|---|---|
| 3,721,950 | A * | 3/1973 | Jorgensen et al. | 367/2 |
| 3,725,918 | A | 4/1973 | Fleischer et al. | |
| 3,971,018 | A * | 7/1976 | Isbister et al. | 342/41 |
| 4,924,698 | A | 5/1990 | Echert et al. | |
| 5,633,644 | A | 5/1997 | Schüssler et al. | |
| 5,660,131 | A * | 8/1997 | Gulling et al. | 114/40 |
| 5,793,813 | A | 8/1998 | Cleave | |
| 6,273,771 | B1 | 8/2001 | Buckley et al. | |
| 7,047,114 | B1 * | 5/2006 | Rogers | 701/21 |
| 7,768,443 | B2 * | 8/2010 | Imazu et al. | 342/41 |

(Continued)

FOREIGN PATENT DOCUMENTS

| | | | |
|---|---|---|---|
| CA | 1210280 | A1 | 8/1986 |
| WO | 9605562 | A1 | 2/1996 |

OTHER PUBLICATIONS

International Search Report and Written Opinion, received in corresponding PCT application No. PCT/US2012/038979, mailed Aug. 29, 2012.

(Continued)

*Primary Examiner* — Mary Cheung
*Assistant Examiner* — Rodney Butler
(74) *Attorney, Agent, or Firm* — Wong, Cabello, Lutsch, Rutherford & Brucculeri, LLP

(57) ABSTRACT

A marine threat monitoring and defense system and method protects a target vessel in icy or other marine regions. The system uses communications, user interfaces, and data sources to identify marine obstacles (e.g., icebergs, ice floes, pack ice, etc.) near a target vessel performing set operations (e.g., a stationed structure performing drilling or production operations or a seismic survey vessel performing exploration operations with a planned route). The system monitors positions of these identified marine obstacles over time relative to the target vessel and predicts any potential threats. When a threat is predicted, the system plans deployment of support vessels, beacons, and the like to respond to the threat. For example, the system can direct a support vessel to divert the path or break up ice threatening the target vessel.

19 Claims, 10 Drawing Sheets

(56) References Cited

U.S. PATENT DOCUMENTS

| | | | | |
|---|---|---|---|---|
| 2007/0210953 | A1* | 9/2007 | Abraham et al. | 342/29 |
| 2009/0167592 | A1* | 7/2009 | Kao et al. | 342/41 |
| 2009/0207020 | A1* | 8/2009 | Garnier et al. | 340/541 |
| 2009/0271054 | A1 | 10/2009 | Dokken | |
| 2010/0226204 | A1* | 9/2010 | Gagliardi et al. | 367/16 |
| 2011/0188938 | A1* | 8/2011 | Nedwed et al. | 405/79 |

OTHER PUBLICATIONS

Power, D., et al., "State of the Art in Satellite Surveillance of Icebergs and Sea Ice," Offshore Technology Conference (OTC 22102), copyright 2011.

Edmond, C., et al., "State of the Art in Satellite Surveillance of Icebergs and Sea Ice," Offshore Technology Conference (OTC 22102), copyright 2011.

Hanvig, K., et al., "Near Real Time Iceberg Detection and Sea Ice Classification Using Satellites—Status, Potential and Limitations for the Offshore Industry," Offshore Technology Conference (OTC 22104), copyright 2011.

Hamilton, J., et al., "Ice Management for Support of Arctic Floating Operations," Offshore Technology Conference (OTC 22105), copyright 2011.

Fissel, D., et al., "Real-Time Pack Ice Monitoring Systems—Identification of Hazardous Sea Ice Using Upward Looking Sonars for Tactical Support of Offshore Oil and Gas Projects," Offshore Technology Conference (OTC 22106), copyright 2011.

Backman, A., et al., "Green Management—Enabling Arctic Exploration and Reducing its Environmental Impact," Offshore Technology Conference (OTC 22107), copyright 2011.

Magnell, B. et al., "Waves, Ice Draft and Floe Size Measurements in the Beaufort Sea Using Bottom-Mounted Ice, Wave and Current Acoustic Profilers," Offshore Technology Conference (OTC 22108), copyright 2011.

Reunion Consultiva Del Tratado Antartcio, "An Antarctic Vessel Traffic Monitoring and Information System—Buenos Aires Jun. 20-Jul. 1, 2011," obtained from www.asco.org, undated.

exactEarth, "Use Case: Arctic Monitoring," Brochure obtained from www.exactearth.com, copyright 2011.

exactEarth, "Applications: Use Cases," webpage generated from www.exactearth.com/applications/use-cases/, generated May 5, 2012, copyright 2012.

Subcommitte on Ship Design & Equipment, "Vessel Monitoring and Traffic Systems," dated Jan. 14, 2011.

Environmental Systems Research Institute, Inc., "ESRI Shapefile Technical Description," ESRI White Paper, copyright 1997, 1998.

Provincial Aerospace, Ltd., webpages for "Products and Services at a Glance," "Ice Management Group," "Ice Management," "Meteorological Management," and "The RAVEN Project," obtained from www.provincialaerospace.com/ on May 22, 2012, copyright 2010.

Provincial Aerospace, Ltd., "Excellence in maritime surveillance and search and rescue," Brochure obtained from www.provincialaerospace.com/ on May 22, 2012, undated.

Diekmeyer, P., "Provincial Aerospace," reprinted from Canadian Defence Review, Oct. 2010.

Safer, A., "The Sky's the Limit @ PAL," Reprinted from Marine Technology Reporter, Nov./Dec. 2011.

Larkin, F. K., "From the Rock to the World: A position report on St. John's, Newfoundland's Provincial Aerospace," obtained from www.wingsmagazine.com, generated May 22, 2012, undated.

Danish Examination Report from counterpart DK Appl. No. PA 2012 70484, dated Jun. 28, 2013.

* cited by examiner

MARINE THREAT MONITORING AND DEFENSE SYSTEM

CROSS-REFERENCE TO RELATED APPLICATIONS

This application claims the benefit of U.S. Provisional Appl. No. 61/488,879, filed 23 May 2011, which is incorporated herein by reference in its entirety and to which priority is claimed.

BACKGROUND

Oil and gas production operations in new regions, such as the arctic, have dramatically increased over the past few years. This increasing activity makes it more likely that fixed or floating production platforms, drill ships, and other structures will be used in these regions. A concern for these types of structures in such regions is potential for damage caused by objects that are uncontrolled and floating or submerged in the water, such as flotsam, jetsam, debris, icebergs, ice floes, and other threats ("marine obstacles"). In icy regions, for example, large icebergs and strong ice floes can pass through survey, production, and drilling areas. Although production vessels may be designed to handle some impacts from such marine obstacles, the vessels may have limits on how long impacts can be sustained and what force of potential impacts that can be handled safely.

For these reasons, operators on a production vessel or other structure will need to anticipate and defend against threats from obstacles so the production vessel can be sufficiently protected. If conditions become too dangerous, operators may also need to suspend operations and move the production vessel away until it is safe to return to normal operations. Being able to do so reliably can be of utmost importance to operators.

The subject matter of the present disclosure is directed to overcoming, or at least reducing the effects of, one or more of the problems set forth above.

SUMMARY OF THE DISCLOSURE

A marine threat monitoring and defense system and method protects a target marine structure conducting "set" operations in regions having marine obstacles that can threaten the structure. In general, the target marine structure can be a production vessel, a production platform, a drilling ship, a wellhead, a riser, a seismic survey vessel, or other marine structure used in drilling, production, or exploration operations at sea or the like. The structure can be floating or fixed and can be permanently or temporarily affixed to the sea floor. Therefore, the structure can be stationed (i.e., "set") for drilling, tanker loading, well workover, subsea maintenance, or other such drilling or production operation. For exploration, the structure, such as a seismic survey vessel, can traverse an area of exploration with a planned (i.e., "set") route for seismic acquisition or other such exploration operation.

An icy region, such as the arctic, has icebergs, ice floes, and other obstacles that float in the ocean waters and are carried by currents and other weather conditions, and such obstacles can threaten a structure conducting set operations (e.g., a vessel stationed for drilling or production or a vessel with a planned route for exploration) in such a region. Other waterways, such as oceans, seas, lakes, rivers, estuaries, and coastal regions, can have flotsam, jetsam, and debris that float in waters and are carried by currents and other weather conditions. Just as ice can threaten operations, these marine obstacles can threaten the "set" structure as it conducts stationed or planned operations in the waterways.

To deal with marine threats to the target marine structure, the computer-based monitoring system has a client-server architecture and has various components and processes distributed throughout the system in the environment around the target vessel. The system uses communications, user interfaces, and data sources to identify marine threats and obstacles in a vicinity of the target vessel.

As operations proceed, for example, the system and its operators monitor the positions and movements of identified marine obstacles over time relative to the target vessel and predict any potential threats to the target vessel. The threat predictions can be based on past, present, and projected variables including, but not limited to, the path of the marine obstacles, currents, wind speed and direction, wave height, other weather conditions, existing operations on the target vessel, and other considerations. When a threat is predicted, the system and its operators plan a threat response, which can involve deploying at least one resource in response to the predicted threat. This planning can use a number of user interface screens that allow system operators to view, organize, monitor, and track both the marine obstacles and the resources in the vicinity of the target vessel.

In general, the resources can be manned or un-manned support vessels, beacons, remotely operated vehicles, aircraft, and the like. In planning the deployment of a support vessel, for example, the system can generate a track for the support vessel to monitor or engage with marine obstacles in order to divert or break up the marine obstacles to prevent or minimize its potential impact with the target vessel. In planning deployment of a beacon having a GPS transponder, for example, the system can select which marine obstacles may need such monitoring and tracking.

Over all, the monitoring system protects the target vessel in real time by centrally monitoring the surrounding conditions and any ongoing activities. For example, the monitoring system can track positions of marine obstacles, monitor environmental conditions, forecast movements of marine obstacles, organize scouting expeditions of marine obstacles, organize ice breaking routes for vessels, place and track beacons on marine obstacles in real time, and produce alarms based on object movement forecasts around the target vessel. To ultimately deal with threats, system operators on the target vessel and the support vessels may carry out various tasks to gather information and to manage and control responses to the various threats. Some of these tasks include scouting for threats, monitoring or tagging specific threats, breaking up threats, and actively changing the path of threats.

As will be appreciated, having correct information is helpful in making decisions to defend the target vessel. To accomplish this goal, the system uses real-time data management, data communications, vessel tracking, and object tracking. To then aid analysis and decision-making, the system operators can view the latest imagery and observed position data of these elements. Moreover, the predictive features of the system uses ocean current prediction models, transponder observations, and obstacle tracking so the system can make predictions into the future and operators can model possible scenarios that will occur.

In the end, the disclosed system provides the system operators with relevant information to take a course of action to protect the target vessel from incoming threats. Making incorrect decisions could be very costly and impact various financial, safety, and environmental issues. Therefore, the monitoring system advantageously enables operators to order how the target vessel can be defended, shutdown and withdrawn from the region if risk levels become too high.

DETAILED DESCRIPTION

A. Overview of Monitoring System

Figure 1:
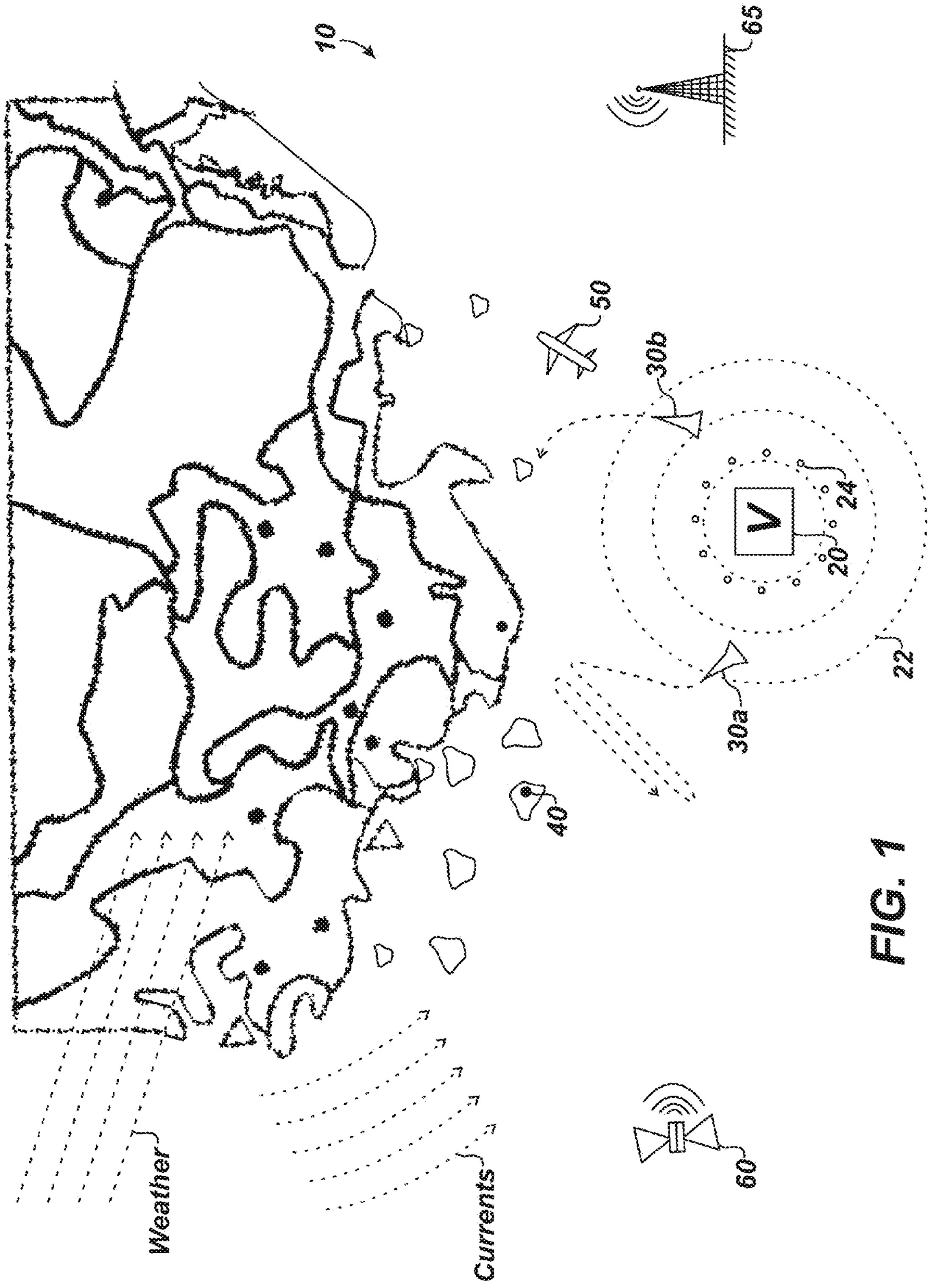
FIG. 1 schematically shows a marine threat monitoring and defense system according to the present disclosure.

As noted previously, protecting attached, fixed, or stationary marine structures or marine structures with planned movements or routes from marine obstacles and impacts presents a significant challenge to drilling, production, and exploration operations in some marine regions, such as the arctic. To meet this challenge, operators on such a structure can use a marine threat monitoring and defense system 10 as schematically illustrated in FIG. 1. The monitoring system 10 protects a target marine structure 20 in a region, such as the arctic, having floating and/or submerged objects that move in the ocean and threaten the structure 20.

In general, the target marine structure 20 can be a production vessel, a production platform, a drilling ship, a wellhead, a riser, a seismic survey vessel, or other marine structure used in drilling, production, or exploration operations at sea. The structure 20 can be floating or fixed and can be permanently or temporarily affixed to the sea floor. Therefore, the structure 20 can be stationed (i.e., "set") for drilling, tanker loading, well workover, subsea maintenance, or other drilling or production operations in a body of water. For exploration, the structure 20, such as a seismic vessel, can traverse an area of exploration with a planned (i.e., "set") route for seismic acquisition or other such exploration operation. In any event, the structure 20 typically operates in one specific location for a period of time to perform its drilling, production, or exploration operations, which makes it vulnerable to moving threats from marine obstacles in the water. For the purposes of description, the structure 20 is referred to herein as a target vessel, but the structure 20 can be any of the several types of structures, vessels, platforms, and the like that are known and used for drilling, production, and exploration in water ways.

As discussed in the examples below, such a target vessel 20 can be used in icy regions having glacial ice, pack ice, ice floes, and other ice obstacles. However, the vessel 20 and elements of the disclosed system 10 can be used in other locations having debris, plants, flotsam, jetsam, or other obstructions or obstacles submerged and/or floating in the water that can interfere with the drilling, production, or exploration operations of the vessel 20. Moreover, the disclosed system 10 can also monitor marine animals, such as schools of fish, whale pods, and the like, so various actions can be taken by the target vessel 20. The disclosed system 10 as described in the examples below can be used to monitor and defend the target vessel 20 in any of these situations in a similar fashion as discussed below.

Being used in an icy region, for example, the target vessel 20 is prone to threats from moving marine obstacles, namely flotsam, jetsam, debris, icebergs, ice floes, loose pack ice, and other hazards, that can impact the vessel 20 and cause structural damage beyond the vessel's limitations. The marine obstacles may be moving freely in the area around the target vessel 20, and weather conditions, ocean currents, wave height, wind direction and speed, and other environmental factors can influence the movements of these threats. Additionally, icy regions may have pack ice of various thickness and layers. Portions of this pack ice may break loose over time and flow in ocean currents to threaten the vessel 20. Therefore, being able to track threats from ice and to monitor pack ice thicknesses and its break up can be beneficial for protecting the target vessel 20 in such a region.

To help operators improve safety and operations (e.g., drilling, production, or exploration), the monitoring system 10 monitors, forecasts, and proactively guards against various threats in the icy region. To achieve these purposes, the system 10 has various support vessels 30, tracking beacons 40, surveillance vehicles 50, and communication equipment (not specifically indicated), among other features to be discussed in more detail later.

In the system 10, equipment on the target vessel 20 acts as a master control, and it communicates directly with each of the support vessels 30 and other components of the system 10. In turn, the various support vessels 30 and other components to be positioned, controlled, and tracked by the system 10 run software features to perform tasks and obtain data for protecting the target vessel 20. Finally, the vessels 20/30 and other components communicate data and instructions between one another to proactively act against threats from marine obstacles.

Briefly, system operators control the system 10 on the target vessel 20 to be protected against incoming ice threats. As operations (drilling, production, or exploration) proceeds and threats arise, the system 10 helps manage and control operations of the support vessels 30 tasked with protecting the target vessel 20 and helps track and monitor ice threats relative to the target vessel 20. As part of this management, the system 10 obtains and uses information about ice formations and locations from various satellites 60, such as weather, imaging, and GPS satellites. Additionally, the system 10 can obtain images and other information using remote vehicles 50, such as unmanned aviation vehicles or the like to take photographs or weather information. Moreover, the system 10 can obtain information from remote base stations 65 on land, such as weather stations and the like.

The monitoring system 10 then uses software, communication systems, satellite and weather imaging, and the like so system operators can visualize and manage the various threats around the target vessel 20 and can allocate and direct the various support vessels 30 and other components to track and deal with those threats. To assist in the visualization and management, the system 10 monitors ocean currents, wave height, weather conditions (temperature, wind direction and speed, etc.), debris, and ice in the vicinity of the target vessel 20 in real time, and this information can forecast movements of ice and changes in the environment.

Then, over the course of operations, the system 10 tracks the risks from debris and ice threats and forecasts how those risks might proceed going forward in time. The forecasting can be based on information such as how local ocean currents usually operate, how such currents are operating now, where icebergs or floes are currently located, what is the confidence in any forecast, etc. Additionally, if the target vessel 20 is used for exploration operations, such as seismic surveying, the target vessel 20 has a planned route or track to run. In this instance, the forecasting can be further based on the target vessel's current speed, direction, route, planned track, etc.

Based on the tracked risks and forecasts, the system 10 can then identify and automatically suggest various scenarios to improve the protection of the target vessel 20 by indicating whether obstacles can be moved or broken up in a suitable time frame, by indicating when to disconnect and move the target vessel 20 from a forecasted threat, etc.

Through this monitoring, tracking, and forecasting, the monitoring system 10 obtains and presents a variety of data to the system operators for analysis. Data from direct observations, sensors, and beacons 40 can report real-time location information of the support vessels 30, icebergs, ice floes, ocean currents, wind speed and direction, and other variables of interest. The sensors and beacons 40 can be deployed by hand or by air, dropped from a support vessel 30, a helicopter, an R.O.V. drone, etc. Sensors used can include ice profilers, such as upward looking sonar devices to detect the presence, thickness, motion, and other feature of sea ice. Examples of such devices include Ice Profiler Sonar and Acoustic Doppler Current Profiler that deploy in water at 25 to 60 m below the surface. Additional data for analysis includes, but is not limited to, satellite ice imagery, Environmental Systems Research Institute, Inc. (ESRI) shape files, manually defined obstacles with assigned headings and level of threat, marine current/ice flow prediction models, logged ocean current data, vessel positions and exclusion zones, standard ship and ice radar readings, and automatic identification algorithms. In predicting movements of ice in the water, the system can use ice profilers mounted on the sea floor that can measure ice thickness (draft), floe size, and other measurements.

Combining all of this information, the system operators can then use the system 10 to direct the support vessels 30 to perform selected tasks, such as running defensive marine obstacle breaking routes, physically diverting marine obstacles, visually observing marine obstacles, deploying remote monitoring beacons 40, etc. In the end, the system 10 seeks to identify risks as early as possible, forecast where those risks will move over time, and identify protective measures for dealing with the threats so the target vessel 20 can continue operations. Yet, the system 10 can also identify the level of a threat and what time frame may be need to cease set operations and possibly move or evacuate the vessel 20.

As discussed in more detail below, system operators use a planning tool of the system 10 to proactively monitor the environment, evaluate risks, and make necessary decisions, such as commanding support vessels 30 to intercept marine obstacles that pose a risk and commanding support vessels 30 to perform scouting and icebreaking duties on a predefined track (e.g., "picket fencing," "racetrack," elliptical, orbital, and other patterns). As shown in FIG. 1, for example, the support vessel 30*a* has been tasked with running a picket fence pattern to thwart off threats from ice by breaking up ice and being prepared to move obstacles when needed. The operator can also command support vessels 30 to observe and tag identified marine obstacles that pose a risk. For example, the other support vessel 30*b* in FIG. 1 has been tasked with observing and tagging a particular iceberg. Reconnaissance can also be carried out by remote vehicles 50, such as drones, which can drop beacons 40, take photographs of ice features, make weather measurements, and perform other duties around the target vessel 20. These and other details of the system 10 are discussed below.

B. Components of Monitoring System

With an understanding of the overall monitoring system 10, discussion now turns to additional details of the system's components.

Figure 2:
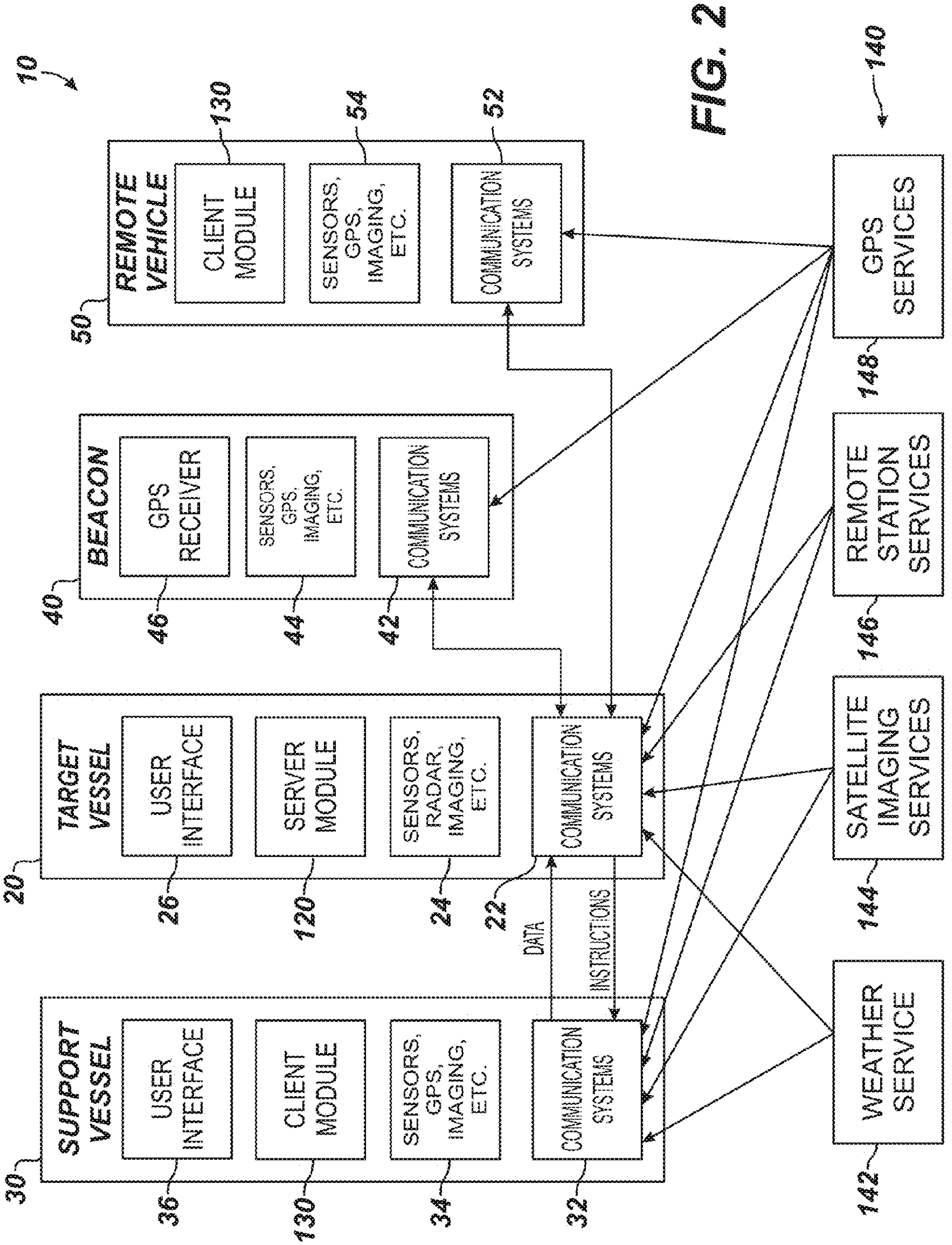
FIG. 2 schematically shows some of the components of the monitoring system, including a target vessel, a support vessel, a beacon, and a remote vehicle, along with various services used by the system.

FIG. 2 schematically shows some of the components of the monitoring system 10, including a target vessel 20, a support vessel 30, a beacon 40, and a remote vehicle 50. Also depicted are various services 140 used by the monitoring system 10. As will be appreciated, other related components can also be used and may be based on some of the same concepts detailed below. Moreover, a given implementation may have more or less of these components.

Looking first at the target vessel 20, it has communication systems 22, sensors 24, server modules 120, and user interfaces 26. During operations, the communication systems 22 obtain data from various remote services 140, including weather 142, satellite imaging 144, remote base station 146, and GPS services 148 using satellite or other forms of communication. Satellite imaging 144 can use Synthetic Aperture Radar (SAR) to map and monitor flotsam, jetsam, debris, icebergs, ice floes, and other sea ice and can provide images in real-time (or at least near real-time) via the Internet or other communication means. In addition to these remote services 140, the target vessel 20 may have its own sensors 24, such as radar, imaging, weather, and other such systems, that can also collect local data in the vicinity of the vessel 20.

At the same time, operators use the user interface 26 and the various monitoring and control features of the server modules 120 to analyze and organize the collected data. The server modules 120 and user interface 26 run on workstations of the system's client-server architecture, which is described later. Based on analysis of threats, predicted paths of obstacles, and tasks to deal with threats, system operators can then relay instructions to the various vessels 30, beacons 40, and remote vehicles 50 distributed in the region around the target vessel 20. In turn, these components 30, 40, and 50 can implement the instructions as detailed herein to handle the threats to the target vessel 20.

For its part, the support vessel 30 has a similar configuration to the target vessel 20 and includes communication systems 32, sensors 34, and user interface 36. Rather than having server modules, the support vessel 30 has client modules 130, which can run on one or more workstations of the system's client-server architecture along with the vessel's server module 120. (Of course, a reverse arrangement could be used in which the target vessel 20 has the client modules 130 and at least one of the support vessels 30 has the server modules 120.) During operations, the support vessel's communication systems 32 can also obtain data from the various remote services 140 and can receive instructions from the target vessel 20.

The vessel 30 also has various local sensors and systems 34 for collecting local data to be used in later monitoring and analysis. Some local systems 34 include weather devices, Differential Global Positioning System (DGPS), echo-sounder, Acoustic Doppler Current Profiler (ADCP), Automatic Identification System (AIS), radar (normal & ice), SONAR, and other systems.

Similar to the target vessel's operations, operators on the support vessel 30 use the user interface 36 and the various monitoring and control features of the client modules 130 to implement the target vessel's instructions. Likewise, the operators can use these components to analyze and organize collected data and relay that data and other information to the target vessel 20 and/or to other support vessels 30.

The beacon 40 can be an ice-mounted beacon for tracking ice obstacles or can be a floating buoy for tracking ocean currents, wave height, and weather conditions. For example, the beacon 40 can be similar to the MetOcean Compact Air Launched Ice Beacon (CALIB), which is a reporting mini beacon. This type of beacon 40 can be deployed from an aircraft, and position-tracking information can be downloaded from a website at regular intervals for use in the disclosed system 10.

As generally shown in FIG. 2, the beacon 40 has a communication system 42, sensors 44, and a GPS transponder 46 as well as local power supply (not shown). Once deployed, the GPS transponder 46 obtains GPS readings from the GPS service 148 for tracking the location of the beacon 40. For example, the beacon 40 deployed on ice can track the movements of the ice, while the beacon 40 deployed in the water, such as on a buoy, can track ocean currents. As the beacon 40 operates, its sensors 44 can obtain weather information, location, and even seismic information. In the end, the collected data and GPS readings from the beacon 40 can be relayed with the communication systems 42 to the vessels 20/30 for incorporation into the various monitoring and control features of the system 10.

Finally, the remote vehicle 50 has communications systems 52 for communicating at least with the vessels 20/30 and the GPS service 148, although communications with other services 140 may be used. Sensors 54 collect data, and a client module 130 handles operations of the vehicle 50. In general, the remote vehicle 50 may be an unmanned drone for deploying beacons 40 or for obtaining aerial images, weather data, and the like of desired locations around the target vessel 20. Alternatively, the remote vehicle 50 may be an ROV or other subsea vehicle for measuring the depth of ice in the water, measuring water temperatures or currents, etc. Being unmanned, the remote vehicle 50 can be remotely operated from the target vessel 20 or even another vessel 30 and can communicate data and instructions with the vessels 20/30.

C. Client-Server Architecture

With an understanding of the overall monitoring system 10 and its components, discussion now turns to additional details of the system's computer architecture. As mentioned previously, the system 10 uses a client-server based architecture. Server modules 120 can be used on the target vessel 20, and client modules 130 can be used on the support vessels 30 and other components. Alternatively, server modules 120 can be used on the support vessels 30, and client modules 130 can be used on the target vessels 20 and other components. Being client-server based, the disclosed system 10 can be used on a single workstation on a single vessel or can be used on multiple servers on multiple vessels.

Figure 3B:
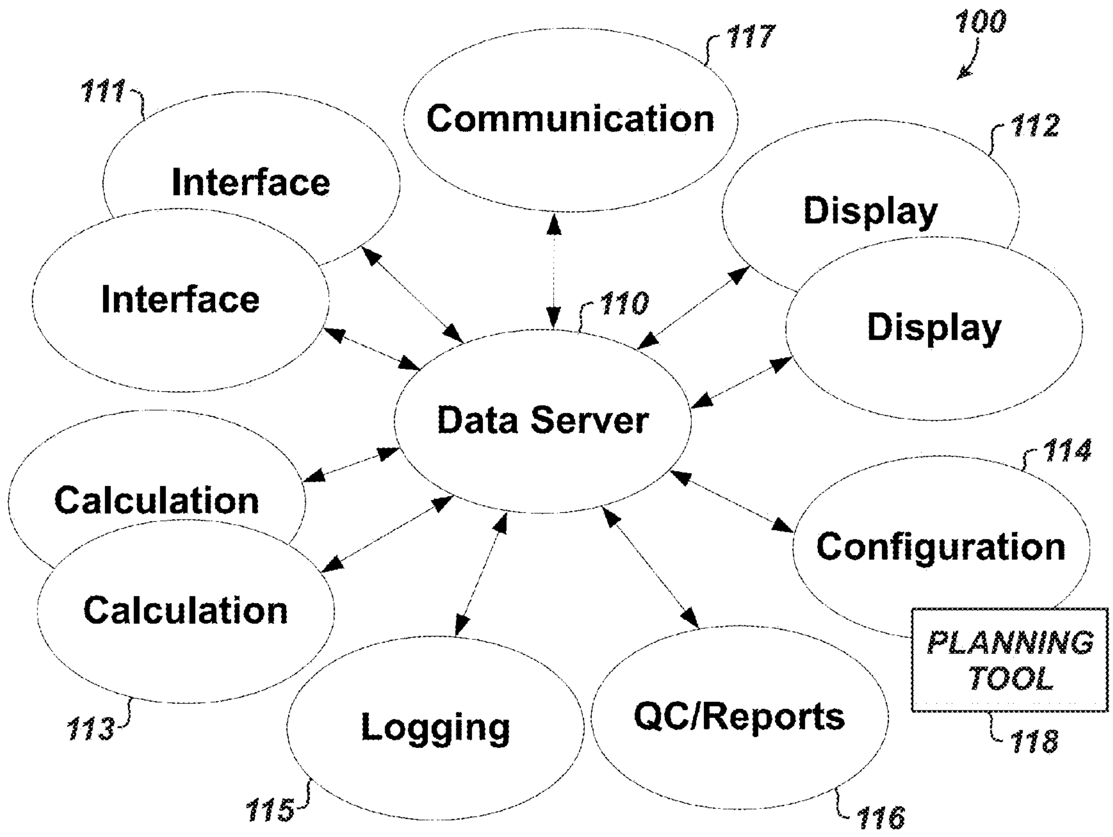
FIGS. 3A-3B show features of a client-server based architecture for the monitoring system.
Figure 3A:
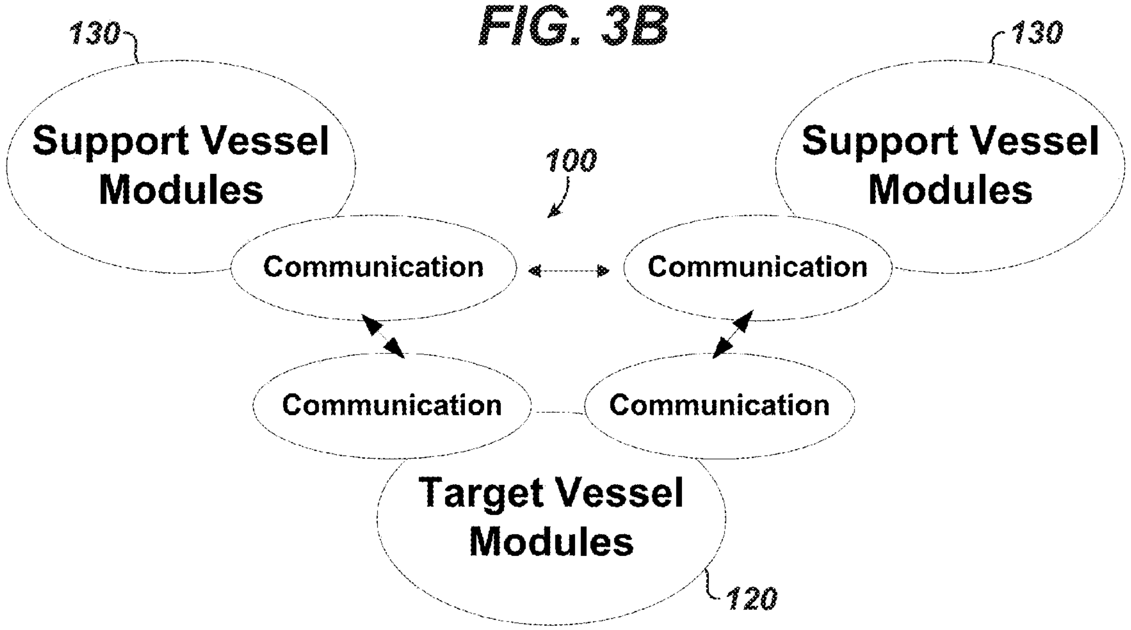

For illustrative purposes, FIG. 3A schematically shows the system's client-server architecture 100 in block diagram form. Briefly, the architecture 100 has server modules 120 on the target vessel (20; FIG. 1) or other components and has client modules 130 for at least two support vessels (30; FIG. 1). As will be appreciated, the system 100 may involve more target vessels 20 and/or more or less support vessels 30. Additionally, client modules 130 can be used on a number of other components, such as remote vehicles, beacons, etc., as noted previously. The various client modules 130 communicate with the sever module 120, which operates as the central control of the system 10. In some situations, however, the client modules 130 can also communicate with one another to pass information and instructions.

Being client-server based, the architecture 100 can have various processes distributed throughout these modules 120 and 130. In this way, a client module 130 on a support vessel 30 can be its own operational system that can operate independently of the server module 120. Yet, the server module 120 can control the overall operation and can add and remove client modules 130 for the support vessels 30 or other components from the architecture's configuration.

To that end, FIG. 3B schematically shows various processes of the client-server architecture 100 that can be distributed and shared across the monitoring system 10 and its modules 120 and 130. A data server process 110 operates as a central process and a communication hub between all the various processes and operates independent of any of the client processes. Various interface processes 111 communicate with onboard equipment of the vessels (e.g., 20/30) to obtain external information. For example, the interface processes 111 can receive information from navigation systems (e.g., GPS, Echosounder, PRH, Gyro, radar, etc.), satellite imaging, weather forecast data, etc. The interface processes 111 can also output information to other systems, such as steering control systems, navigation systems, alarm systems, etc.

Display processes 112 are configured for use on various displays distributed throughout the system's architecture 100. Each display can be configured as required by the user, and various satellite and other images of the environment showing ice formations, weather, and other details can be displayed in user interfaces of the display processes 112 as described below. Additionally, vessel and obstacle positions can be overlaid on the images in the system's user interfaces, and obstacles can be assigned attributes to describe their past and predicted tracks, sizes, levels of threat, and other details.

Calculation processes 113 compute vessel positions, carry out collision detection, predict paths of vessels and obstacles, and perform other calculations. Predicting paths of obstacles can help operators and the system 10 to assess threats and risks and to implement tasks to deal with them. For example, by performing collision detection between vessels 20/30 and ice obstacles, the calculation processes 113 can generate alarms if potential collisions are predicted.

Configuration processes 114 allow operators to configure the system's operation, such as define the data interfaces, displays, workstations, support vessels, logging locations, communication parameters, and any exception criteria for alarms. In addition to operating in conjunction with the target vessel 20, each support vessel 30 can be set up with system components that can operate independently from the target vessel 20. Notably, the configuration processes 114 have a planning tool 118. As discussed below with reference to FIGS. 7A-7D, the planning tool 118 is a graphical application that allows system operators to view operations and define a protection plan for the target vessel 20.

Logging processes 115 log data for monitoring purposes. The architecture 100 logs the various vessel and ice obstacle positions with their corresponding attributes at suitable intervals to create a history of activities. This information can be used for replay analysis or auditing purposes and may be stored in an audit database. Such logged information in an audit database can track all the data acquired and the various operational decisions made, which can be especially useful for reconstructing events should something go wrong during operations. The architecture 100 also tags and logs the ice satellite data files for later reference. Using all of the logged and tagged information, operators can create reports for any vessel or ice obstacle.

Quality control and report processes 116 can generate reports and data for review and analysis. The processes 116 can allow operators to create a variety of graphical reports and can have a diagnostic application (not shown) that monitors the health of the system's architecture 100. The diagnostic application, for example, can provide data relating to the performance and well-being of the system's architecture 100 and can have individual processes and interfaces to external systems. A quality control application (not shown) can allow operators to configure a variety of interactive graphs containing any data logged to the system databases.

Finally, the communication processes 117 pass data between the vessels 20/30, beacons 40, vehicles 50, and other components. Using the various forms of communication, the architecture 100 automatically updates remote units on the support vessels 30 with information. The communications can be sent over maritime Very Small Aperture Terminal (VSAT) satellite links, multi-bandwidth radio links, or other communication links.

Inclement weather often interferes with satellite communications, and wireless communications in the arctic may not always be possible depending on the weather. For this reason, any of the remote sensors, beacons 40, and vessels 20/30 can store data until it can be reported once conditions allow. Additionally, these components can have alternate communication abilities, such as point-to-point radio, so a drone or vessel can be directed near any key sensor or component to retrieve data and report it back during satellite or wireless outages.

D. Processing Methodology

Figure 4A:
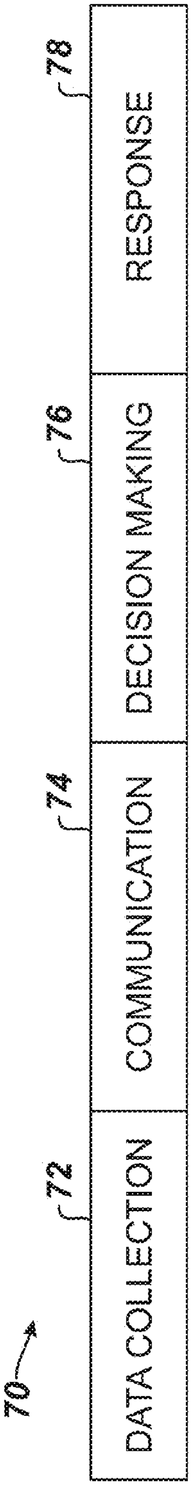
FIGS. 4A-4B schematically show a general processing and data handling methodology for the monitoring system.

The components of the disclosed monitoring system 10 using the client-server architecture 100 as outlined previously follow a general processing methodology as schematically illustrated in FIG. 4A. As shown, the system's processing methodology 70 involves data collection (Block 72), communication (Block 74), decision-making (Block 76), and threat response (Block 78).

Figure 4B:
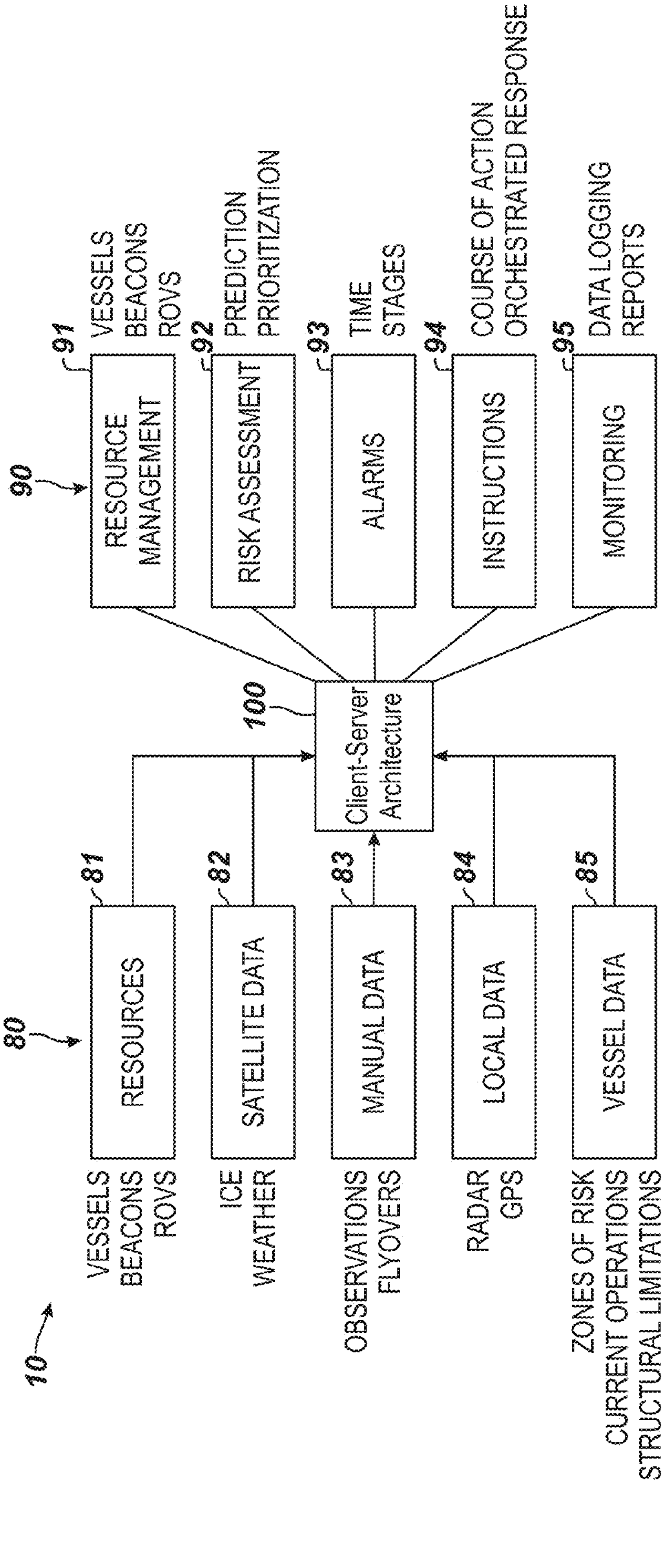

As an initial matter and as shown in FIG. 4B, the client-server architecture 100 has various resources and data sources 80, which are involved in the data collection (Block 72) of the system's processing methodology 70 of FIG. 4A. As noted previously, some of the resources 81 include the vessels, beacons, remote vehicles, and other components for collecting data for the client-server architecture 100. Satellite data 82 can come from weather, ice imaging, and GPS satellites, and manual data 83 can come from visual observations, flyovers, and the like. The client-server architecture 100 can also obtain local data 84 at the target vessel (20; FIG. 1), from radar, GPS, and the like.

Finally, the target vessel (20) has its own electrical, alarm, and operational systems, and this target vessel data 85 can be used by the client-server architecture 100. Furthermore, any current operations performed on the vessel (20) and the vessel's structural limitations can be part of the vessel data 85 available to the client-server architecture 100. For example, the target vessel (20) may be able to handle various levels of wind, current, and ice over a certain period of time, but may have structural limits that need to be accounted for.

As another example of vessel data 85, current operations (drilling, production, or exploration) being performed with the target vessel (20) may dictate how much time is needed to shut down the vessel (20) and move it to another location if needed. In other words, the vessel (20) may need to halt drilling, to pull a riser, or to pull in seismic streamers before the vessel (20) can be moved or redirected, and these operations can take a particular amount of time to complete. If these operations are occurring on the vessel (20), any time frame for risk assessment can account for the length of time to complete the "set" (i.e., stationed or planned) operations, to shut down the operations (e.g., stop drilling, remove a riser, reel in seismic streamers, etc.), to move the vessel (20), to evacuate the personnel, and the like. Any time intervals involved will depend on the type of structure (i.e., vessel 20) involved, the type of "set" (i.e., stationed or planned) operations being performed (e.g., drilling, production, exploration, etc.), and other factors.

To obtain and transfer all of this collected data (Block 72) as shown in FIG. 4A, the client-server architecture 100 uses various forms of communication (Block 74). As noted throughout, the various components of the system 10 can use any of a number of available forms of communication (Block 74) for the environment of interest. In general, satellite or radio communications can be used depending on weather conditions, and other forms of wireless communication using relay stations and the like can be used. As will be appreciated, many types of communication systems can be used.

Having the collected data (Block 72) communicated to it, the client-server architecture 100 goes through various decision-making processes (Block 76) to develop a managed response (Block 78). The decision-making process (Block 76) can use predictive algorithms, decision trees, risk weighting, and other techniques and can be handled by automatic computer processing and human intervention to handle threats to the target vessel 20 from ice and the like.

In particular, the architecture 100 in the decision-making and response processes (Blocks 76 and 78) manages the resources and data sources 80 and their data collection (Block 72) by tracking, directing, and configuring the vessels 30, beacons 40, and the like to collect data and address threats. Then, the client-server architecture 100 can provide operators on the vessels 20/30 with results 90, such as resource management 91, risk assessment 92, alarms 93, instructions 94, and monitoring 95.

In the resource management 91, for example, system operators can manage various tasks and operations of the vessels 30, beacons 40, vehicles 50, and other resources around the target vessel 20. As operations continue, results for risk assessment 92 can predict threats, prioritize tasks, and perform other assessments. Then, depending on the threats and their severities, alarms 93 can be triggered based on various time intervals or stages to warn operators of threats to the target vessel 20.

Finally, operators can relay instructions 94 to other components of the system 10, such as vessels and the like, and can direct a course of action and orchestrate a response to threats. In the monitoring 95, the client-server architecture 100 monitors the entire operation by logging the data collected and producing reports and the like for further analysis.

E. Operation of System

With an understanding of the components of the system 10, its architecture 100, and the various processes used, we now turn to discussion of how the monitoring system 10 operates to protect a target vessel 20 from threats in a given region. Again, the current example focuses on threats encountered in an icy region, but the system 10 can be applied to any marine region in which threats can be encountered.

1. Dealing with Marine Obstacle Threats

Figure 5:
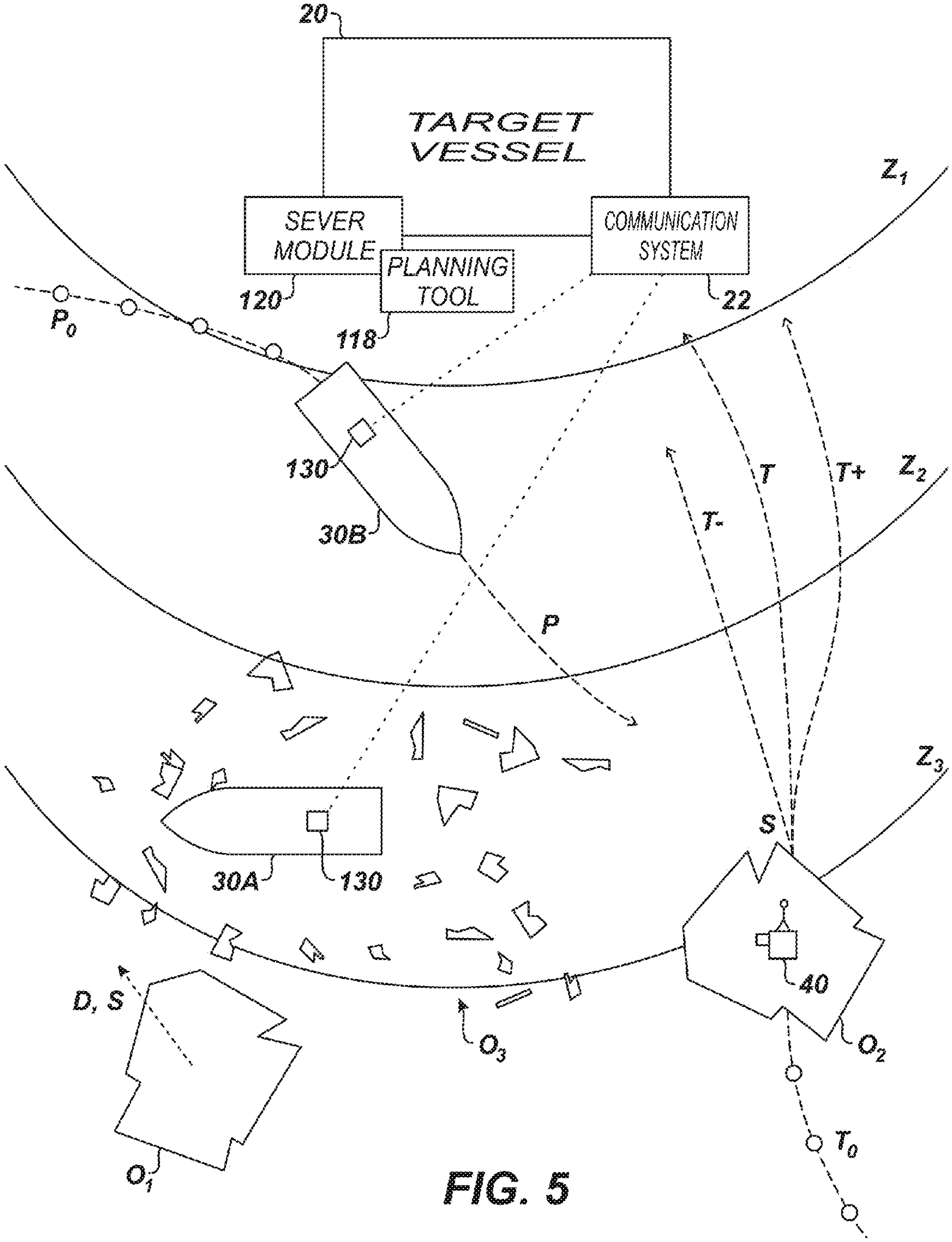
FIG. 5 conceptually shows components of the monitoring system in an example arrangement during operations.

To help illustrate how threats are identified and monitored and how tasks and plans are generated to deal with them, we turn to the example shown in FIG. 5, in which components of the system 10 are conceptually shown along with some possible graphical elements that may be displayed in user interfaces of the system 10, such as in the planning tool 118 as described herein. The target vessel 20 is shown with only some of its components, including server module 120, communication system 22, and planning tool 118, but the other components would be present as well. Two support vessels 30*a-b* are also shown in this example with each having a client module 130. Finally, various ice obstacles O are shown in this example, including a first obstacle $O_1$, a second obstacle $O_2$, and various smaller obstacles $O_3$. One of these obstacles $O_2$ has a beacon 40 deployed on it.

In general, the marine obstacles O can be flotsam, jetsam, debris, icebergs, ice floes, and other floating threats to the target vessel 20 carried by ocean and with currents, and the marine obstacles O can be defined as single or multi-point objects in the system 10. Each marine obstacle O in the system 10 can have a set of attributes associated with it—some of which can be displayed as described later. The attributes can be obtained in various ways, such as manually entered coordinates; graphically defined information with a display screen and mouse control; automatically obtained from radar targets, satellite images, or a beacon 40; and other ways.

At the target vessel 20 and the support vessels 30, the server and client modules 120/130 can be used to create and delete the various marine obstacles O in the vicinity of the target vessel 20. The obstacle information is preferably passed automatically between each of the vessels 20/30. For consistency across the system 10, the obstacle information is distributed automatically between the various vessels 20/30.

Using the exchange of information, for example, obstacle information can be displayed on local user interfaces of the outlying support vessels 30. These local user interfaces outline at least all of the active threats in the local area. Using the client modules 130, local operators on the support vessels 30 can create and remove obstacles O in the system 10 and modify their attributes. During monitoring activities, the support vessels 30 can also physically tag obstacles O with the disposable navigation beacons 40 used to track the obstacle's movement in real-time.

Figure 6:
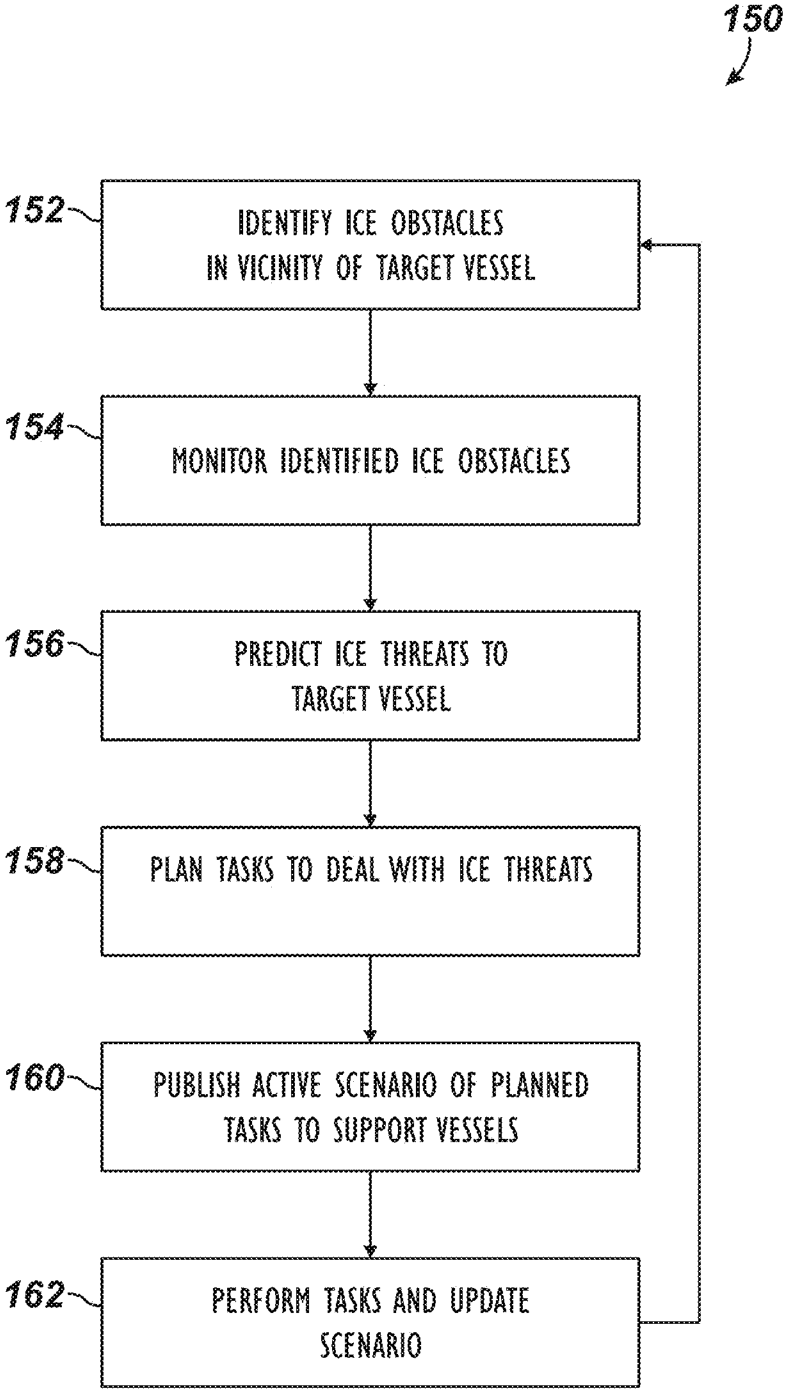
FIG. 6 shows a process in flow chart form for monitoring threats for a target vessel.

While discussing particular examples of the system's operation with reference to FIG. 5, discussion also looks at a monitoring process 150 shown in FIG. 6. Although a general methodology has already been discussed, the process 150 in FIG. 6 for monitoring threats to the target vessel 20 is laid out in some additional detail.

In the monitoring process 150, system operators access user interfaces of the planning tool 118 of the disclosed system 10, which enables the system operators to monitor threats. Initially, the system operators identify the marine obstacles O in the vicinity of the target vessel 20 (Block 152). As noted before, this can use manual observation, satellite imaging, ice imaging, and the like. Details about the obstacle's position, size, shape, direction, etc. are imported into the system's planning tool 118, and the system operators can use the planning tool 118 to create and edit details about the obstacle. Some, if not all, of these functions can be automated using software programs.

Over time, the planning tool 118 monitors the position of these identified obstacles O relative to the target vessel 20 (Block 154). This monitoring produces historical tracks T of the obstacles O, which can be viewed by the system operators and analyzed by the system 10. Thus, the planning tool 118 can predict the tracks T for obstacles O based on historical movements, ocean currents, size and position of obstacles, etc. (Block 156). These predictions then define what threats may exist to the target vessel 20 and what possible time frames those threats may take to become imminent.

The system operators then use the planning tool 118 to plan various tasks to respond to the predicted threats (Block 158). To do this, the system operators can configure a number of tasks or assignments to be performed by support vessels 30 and other components. These various tasks can be arranged in various scenarios in which particular resources (e.g., support vessels 30, beacons 40, remote vehicles 50, etc.) are deployed in different ways to deal with predicted threats. Each scenario is essentially a model of predictions showing possible movements and changes of threats in the environment and possible strategies and tasks for dealing with the threats. Thus, the scenarios allow the system operators to create and analyze multiple "what if" situations using the observed data available in the system 10. Each scenario can have differing prediction models applied and can allow the system operators to visualize possible outcomes and threats.

For each scenario, the disclosed system 10 uses the selected marine obstacle prediction models to predict the track T for each obstacle O and constantly checks for the possibility of future collisions. The target vessel 20 can also be assigned multiple safety boundaries Z, such as the boundaries $Z_1$, $Z_2$, and $Z_3$ in FIG. 5. If any of the marine obstacles O encroaches on the vessel's safety boundaries Z, the system 10 raises an alarm, which can be displayed and logged. This information allows the system operators to decide on the optimal course of action to protect the target vessel 20.

When the system operators are satisfied with a scenario's prediction models and vessel task lists, the system operators then choose a scenario and publish it throughout the system 10 (Block 160). This makes the scenario active and distributes it to the various support vessels 30 and other system components. Graphical reports, maps, user interface screens, etc. can then be generated that describe the scenario, vessel tasks, ice obstacle movements, and the like.

When the support vessels 30 receive the new active scenario, for example, vessel operators can uses the system's planning tool 118 operating on the vessel's modules 130 to identify the tasks to be performed. The various tasks can be listed as planned together and can indicate the suggested tracks, estimated time of arrivals, and durations for the tasks. As the tasks are performed, vessel operators can update the status of each task in the task plan by indicating such status as accepted, rejected, active, completed, and abandoned (Block 162). For consistency, the task status updates can then be automatically saved and distributed to other parts of the system 10 so all operators know precisely the state of the scenario plan.

With an understanding of the monitoring process in FIG. 6, discussion refers to FIG. 5 to discuss some particular examples of the system's operation with reference to the example arrangement of components shown. As noted previously, various obstacles O, support vessels 30, and the like surround the target vessel 20, and the system 10 can store particular details for these components. System operators on the target vessel 20 and support vessels 30 can examine and update the details at any time.

During the course of operations, for example, the system 10 tracks actual ice motion with historical tracks $T_0$. Once an ice obstacle is created, for example, the system 10 records a history of previous positions, which updates overtime and can be recorded. In turn, the recorded data can be used to refine a tracking model and other features of the system 10.

The system 10 also follows ice obstacles O tagged with positional beacons 40, such as ice obstacle $O_2$ shown with a beacon 40. As noted previously, the beacon 40 transmits updates of the obstacle's position, which can be received by any vessel 20/30. These position updates are passed back to the target vessel 20 for permanent logging and provides historical information for tracking the obstacle $O_2$. Thus, obstacle positions update automatically as new transponder location files are downloaded and imported so that an observed track T builds up in the disclosed system's database.

In addition to tracking ice obstacles O, the system 10 can track the paths P of support vessels 30 showing where the vessels 30 have been. Moreover, the system 10 can define diversion paths that the support vessels 30 are expected to perform to handle ice obstacles O. This lets operators plan for complete coverage and indicates if any obstacles O have been missed or inadequately addressed.

As hinted above, the system 10 can also predict future ice motions based on available information, including historical tracks, ocean currents, wind directions, weather forecast data, direct tracking information from remote beacons, and the like. To predict the ice obstacles' future tracks, the planning tool 118 allows the operators to tag any number of ice obstacles O. Then, the system and operators can automatically or manually update or move the obstacles O as new satellite images are imported and visualized.

The disclosed system's planning tool 118 can then offer a number of prediction models for ice obstacles O. For example, a manual ice obstacle prediction model can offer a fixed procedure. In this model, the system can simply assign speeds and headings to the obstacles O. System operators can either leave the default speed and heading, or these details can be updated as required. As part of this manual tracking, the operator can use the visualization features of the system's user interface to manually plot the predicted directions D and speeds S based on the observed obstacles' motions and the ice images over time. In one example, the first obstacle $O_1$ has a single speed S and direction D assigned to it, and these details can identify at least the short term movement of the ice obstacle $O_1$. This information may then be used to predict forward movement of the obstacle $O_1$ from its last recorded position.

As opposed to the manual prediction, the system 10 can also perform automatic ice obstacle prediction. Using the historic tracks discussed above, the disclosed system 10 uses the observed ice obstacles' tracks and predicts the future tracks and speeds. Going forward, updated information about ocean currents, wind directions, etc. can be further used to refine the predicted tracks and speeds.

For example, the speed S and historical track $T_0$ of the ice obstacle $O_2$ can be used to generate a predicted track T, which can have a range of probability (i.e., T+ to T−). This may be helpful in predicting movements of large areas of ice over several days and weeks so system operators can visualize ice threats and their predicted tracks.

Based on the predicted tracks of each obstacle O, the system 10 determines which of the obstacles O pose a future threat to the target vessel 20. The system 10 then raises alarms identifying different levels of threat. Based on the alarms, operators on the target vessel 20 and/or support vessels 30 can the plan the best course of defense.

For example, obstacles O can have threat levels based on the predicted tracks T and other information of the obstacles O. Various threat levels can be set depending on the implementation and the amount of definition desired. For example, a "minor" threat level can be used for obstacles O posing low operational threat. This may be the case for the smaller obstacles $O_3$ that are too small to endanger the target vessel 20 and its operations or are not anticipated to come close to the vessel 20. With such a minor threat level, the obstacles $O_3$ could potentially be handled by support vessels 30, either breaking them up or diverting their paths (i.e., by towing them with tow line or net or by pushing them with a water jet or the like). However, if the obstacle $O_3$ is left alone and remains at this level, the obstacles $O_3$ may not pose an operational risk to the target vessel 20.

In another example, a "medium" threat level can define obstacles that pose an operational risk to the target vessel 20, but can be handled by support vessels 30 and/or the target vessel 20. For example, the first obstacle $O_1$ may have a medium threat level because its predicted track $T_1$, size, current speed, etc. can be handled by local vessel 30A.

Finally, a "major' threat level can define obstacles that pose an operational risk to the target vessel 20 and cannot be handled by the support vessels 30 and/or the target vessel 20. For example, the ice obstacle $O_2$ may have a detrimental track $T_2$ and may be too large or too fast to divert by a local vessel 30B.

To help define threats, the system 10 can use multiple safety boundaries (e.g., $Z_{1-3}$) defined in the environment around the target vessel 20. These boundaries Z can visually indicate threats in zones relative to the target vessel 20 and can alert operators when an ice obstacle O may be entering a restricted boundary Z. Each boundary Z may be associated with a needed safety measure to be implemented, such as ceasing drilling, disconnecting moorings, and the like, so that operations can be shut down in time based on the threat imposed.

2. User Interface

As noted previously, the monitoring system 10 uses a number of user interfaces for displays on the vessels 20/30. In general, these user interfaces can show satellite ice data, ice obstacles, radar targets, beacons, vessels, and other elements of the monitoring system 10. Attributes of the various elements can also be viewed, and multiple displays can be configured.

Some examples of the user interface screens 200A-D for the disclosed system 10 are described below with reference to FIGS. 7A-7D. These user interface screens 200A-D can be part of the planning tools (118; FIGS. 3B & 5) operating on the system's architecture 10 on the vessels 20/30 so operators can review information, configure the system 10, track and monitor threats, and plan tasks and other activities in response.

Each of the screens 200A-D of FIGS. 7A-7D can have a main viewing area 210, a number of docks, and ancillary windows or pop-ups, some of which will be described below. As noted previously, system operators use these various user interface screens 200A-D as well as others not detailed herein to visualize the surrounding environment. Accordingly, the main viewing area 210 typically shows image data 212 of a region of interest around or near the target vessel 20. This image data 212 can be a computer-generated map, a satellite image, an ice image, or a combination of these, and information for the image data 212 can be imported from files downloaded from external sources (e.g., 140; FIG. 2).

Figure 7A:
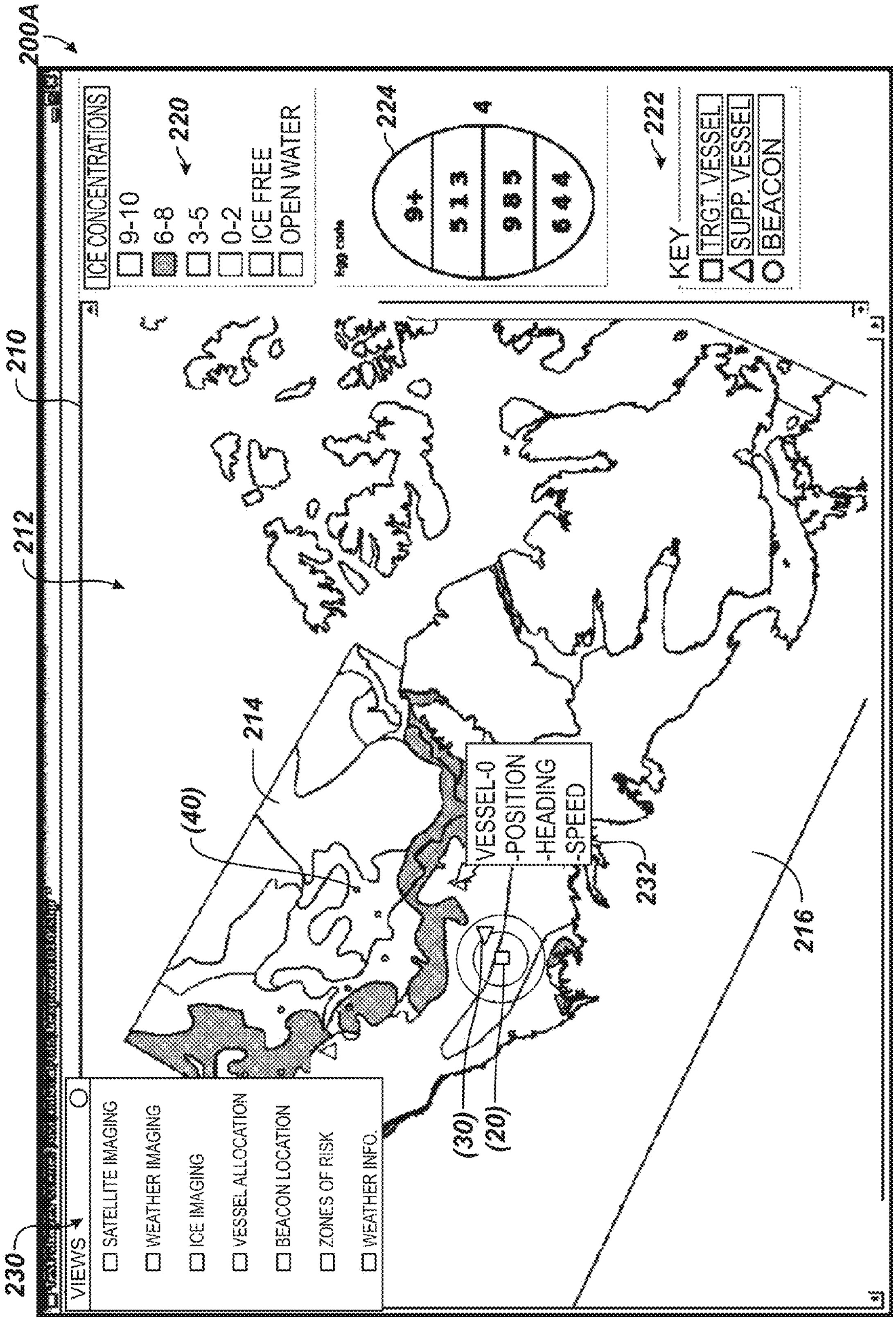
FIGS. 7A-7D show example user interface screens for the disclosed system.

In the example user interface screen 200A of FIG. 7A, for example, the main viewing area 210 has a map 212 of the region around a target vessel (20), which is shown as an icon overlaid on the map 212. For its part, the map 212 of the region of interest can be updated, zoomed in and out of, and otherwise manipulated by system users. Of course, the viewing area 210 of the user interface screens 200A-D can have more than one spatial display, and additional display areas can be manually added and then docked. Moreover, each display can be individually configured. For example, one display area may be configured to display satellite ice images, while another may display the latest ice radar image.

Images for the viewing area 210 can be provided by office-based personnel, remote service providers, or the like so various forms of electronic delivery could be used, including e-mail, ftp server download, Internet feed, satellite links, etc. Additionally, a variety of image formats can be used for display and analysis. For example, ice image formats such as Geotiff Satellite Raster Images and ESRI Shapefile Ice charts can be imported and used. In addition to these ice image formats, the system 10 can import image files in a multiresolution seamless image database (MrSID) format. This file format (filename extension .sid) developed and patented by LizardTech is used for encoding of georeferenced raster graphics, such as orthophotos.

Raw image data can be incorporated into the user interfaces, displays, and other components of the system 10 for use by operators on the vessels 20/30. Moreover, software can perform shape recognition of the ice formations and coordinate the recognized shapes to a map and locations of interest. In turn, this processed information can be made available for the various user interfaces and display modules on the vessels 20/30, allowing operators to visualize ice formations in relation to other components of the system 10. Additional details of user interface elements are described later.

In another example, raw ice data may come in standard geographical file format, such as a GIS file format image, providing visual information of ice formations along with positional information. Some ice information may include indications of ice concentrations and other useful details. Regardless of the file format, however, this ice formation data can be collected from multiple sources and updated at regular intervals.

Once imported, the images are stored in memory (i.e., on a local disk and/or remote server) and referenced within the system 10 for future use in the user interface, such as in screens 200A-D. For example, the images files can be archived by type and indexed by date and time for future use in the user interface screens 200A-D and other features of the disclosed system 10. The target vessel 20 can distribute downloaded image files to the various support vessels 30.

The system operators can then decide to overlay this information onto any display of other information in the user interfaces and displays. In other words, operators can overlay ice formation information onto the various screens, menus, and maps. On the screen 200A, for example, various views can be selected in a window 230 to show or overlay different components or features in this main viewing area 210.

Some general options available for viewing include satellite imaging, weather imaging, ice imaging, vessel allocation, beacon locations, zones of risk, and the like. Thus, over any of the environmental scenes, the screen 200A can display the selected graphical details, such as the location of the vessels 20 and 30, exclusion zones, defined obstacles (current position and historical track of icebergs and floes), pack ice, and other elements as discussed herein. Weather information, such as temperatures, wind speed and direction, high and low pressures, ocean currents, and the like may also be graphically displayed or indicated. In this way, system operators have a range of display options available to configure how data and images are layered and presented in the main viewing area 210.

For example, the main viewing area 210 in FIG. 7A shows ice imaging and shows the relative locations of the various vessels 20/30 and beacons 40 of the system 10. Pack ice 214 is displayed relative to landmasses 216, and the pack ice 214 is shown graphically with concentration information of the ice using color-coding or the like. The vessels 20/30 are graphically shown relative to the pack ice 216 as are the various beacons 40. This information is all input manually and/or automatically into the system based on GPS coordinates and other collected data as disclosed herein.

As further shown in the example of FIG. 7A, attributes associated with an element in the main viewing area 210 can be assessed for display on a dock 220, a pop-up 232, or additional screens (not shown). For example, the dock 220 shows the color-coding and corresponding ice concentrations used in the main view 210.

A key 222 shows the graphical symbols for the various system components, and attributes of the ice can be displayed in an attributes dock 224. Here, the ice attributes can be based on sea ice symbology from the World Meteorology Organization (WMO), which is commonly referred to as the Egg Code and shows a total concentration, a partial concentration, stages of development, and the predominant ice form.

As the system user interacts with the elements of the screen, various pop-ups 232 or the like can display additional information. For example, the mouse has passed over a vessel 30 in the main viewing area 210, and the resulting pop-up 232 shows information about that vessel 30, such as identity, position, heading, speed, etc.

Figure 7B:
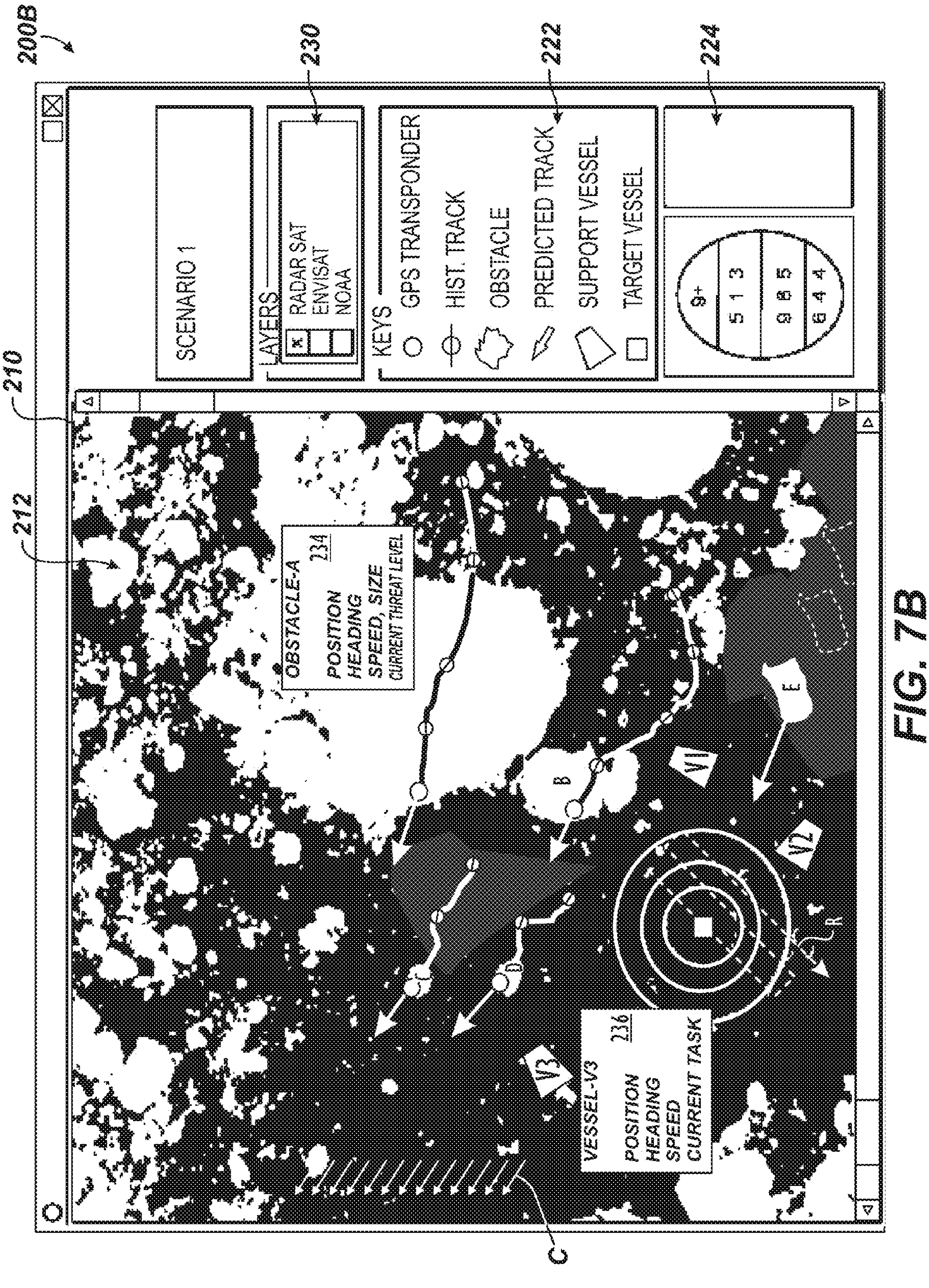

In the example user interface screen 200B of FIG. 7B, the main viewing area 210 again shows an ice image 212, which has been downloaded and imported into the system 10. Additionally, views 230 from other environmental imaging can be selected for display as various layers on the mapped region. Vessels 20/30, beacons 40, and other system components are also display in conjunction with the ice image 212. One vessel $V_3$ is shown with a pop-up having attributes, such as position, heading, speed, and current task. Finer details of the system elements shown can be accessed with the user interface using additional screens so information can be added, updated, and processed as needed.

As noted previously, data from the beacons 40 can be imported from GPS transponder files, and sea current prediction files can also be downloaded, imported, and indexed in the same way. This information can then be used in the user interface screen 200B. In particular, the system operators can visualize and assess the ice threats in the user interface screen 200B. Once an ice threat is identified, the operator on the target or support vessels 20/30 can define the newly identified ice obstacle to be monitored.

For example, four ice obstacles A-D in the vicinity of the target vessel 20 have beacons 40, and their historical tracks and predicted tracks can be monitored and displayed. Obstacle A also has a pop-up showing its attributes, such as position, heading, speed, size, and current threat level. Again, finer details of the obstacles can be accessed with the user interface using additional screens so information can be added, updated, and processed as needed.

As part of the predicted track of the obstacles, the system 10 can access prediction models as discussed previously for ocean and wind currents and can use them to the predicted tracks of the obstacles. The accessed ocean and wind currents can also be displayed in the main viewing area 210, which shows currents C in the vicinity of the target vessel 20.

Finally, as further shown in FIG. 7B, the target vessel 20 may have its own planned route R, for example, if the vessel 20 moves in the water with a set operation, such as when conducting a marine seismic survey. Information about the vessel's planned route R can be used by the system 10 when assessing the prediction models as discussed previously to predicted tracks of the obstacles and their threat to the vessel 20. Additional information about the vessel 20 and its route R can also be used in the prediction models, including, but not limited to, the target vessel's current speed, current direction, future locations, current stage of operation (i.e., whether the streamers are deployed), etc.

Unfortunately, once an obstacle position is defined, the position inevitably changes as the sea ice continues to move. Moreover, it may not always be possible to tag every ice threat with a beacon 40 and watch the position as it auto-updates. Nevertheless, the operator may still wish to identify an ice obstacle in the display and track its movement. To do this, the operator can manually update the position of any defined obstacle at any time, or the system 10 can use shape recognition techniques for the objects in the image data and automatically update their positions.

One such highlighted obstacle without a beacon 40 is obstacle E in FIG. 7B. As positions are logged to the disclosed system's database manually by observation or by shape recognition of ice images, the movement of this highlighted obstacle E can then be tracked visually and calculated relative to the target vessel 20.

Figure 7C:
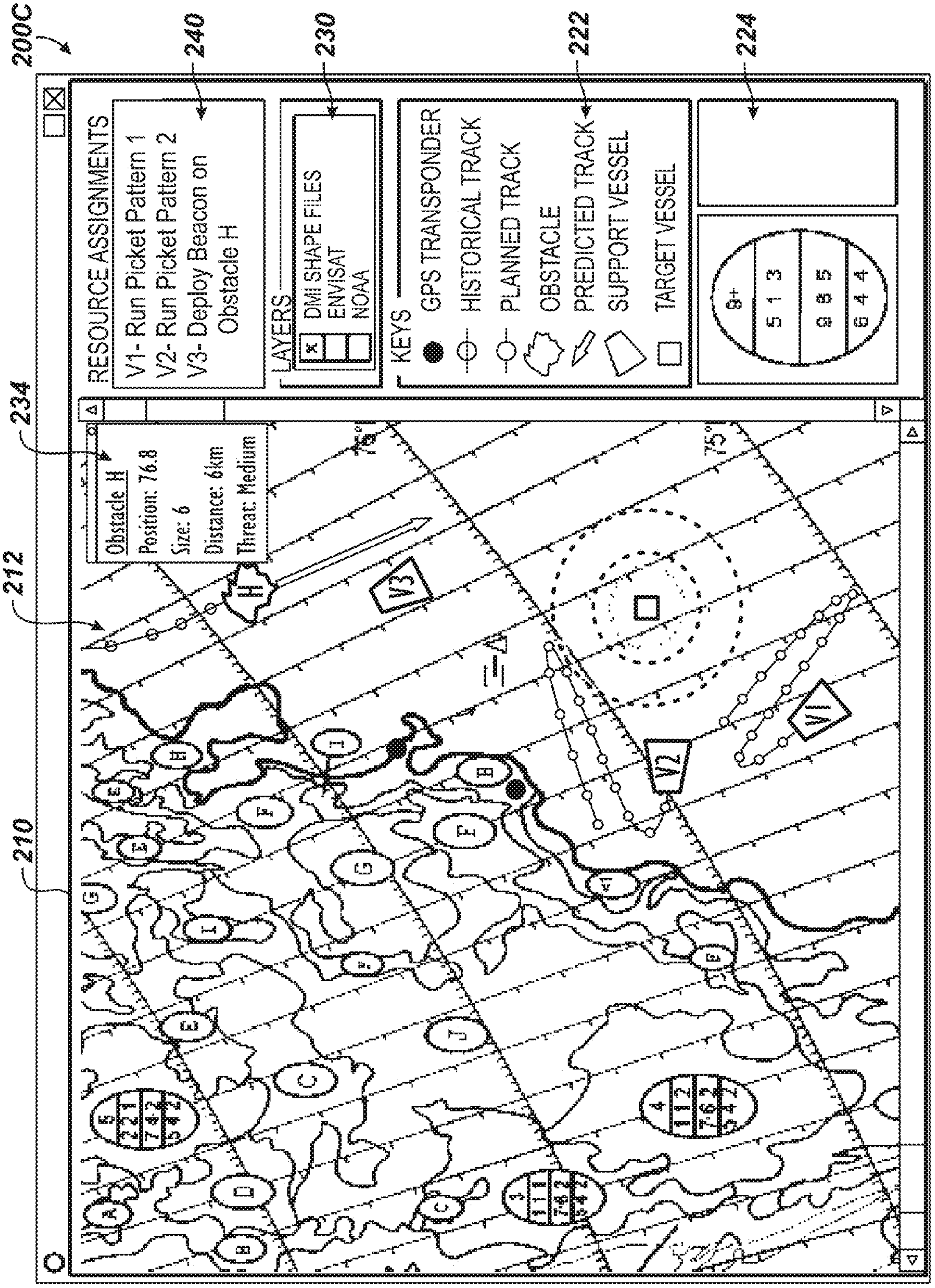
Figure 7D:
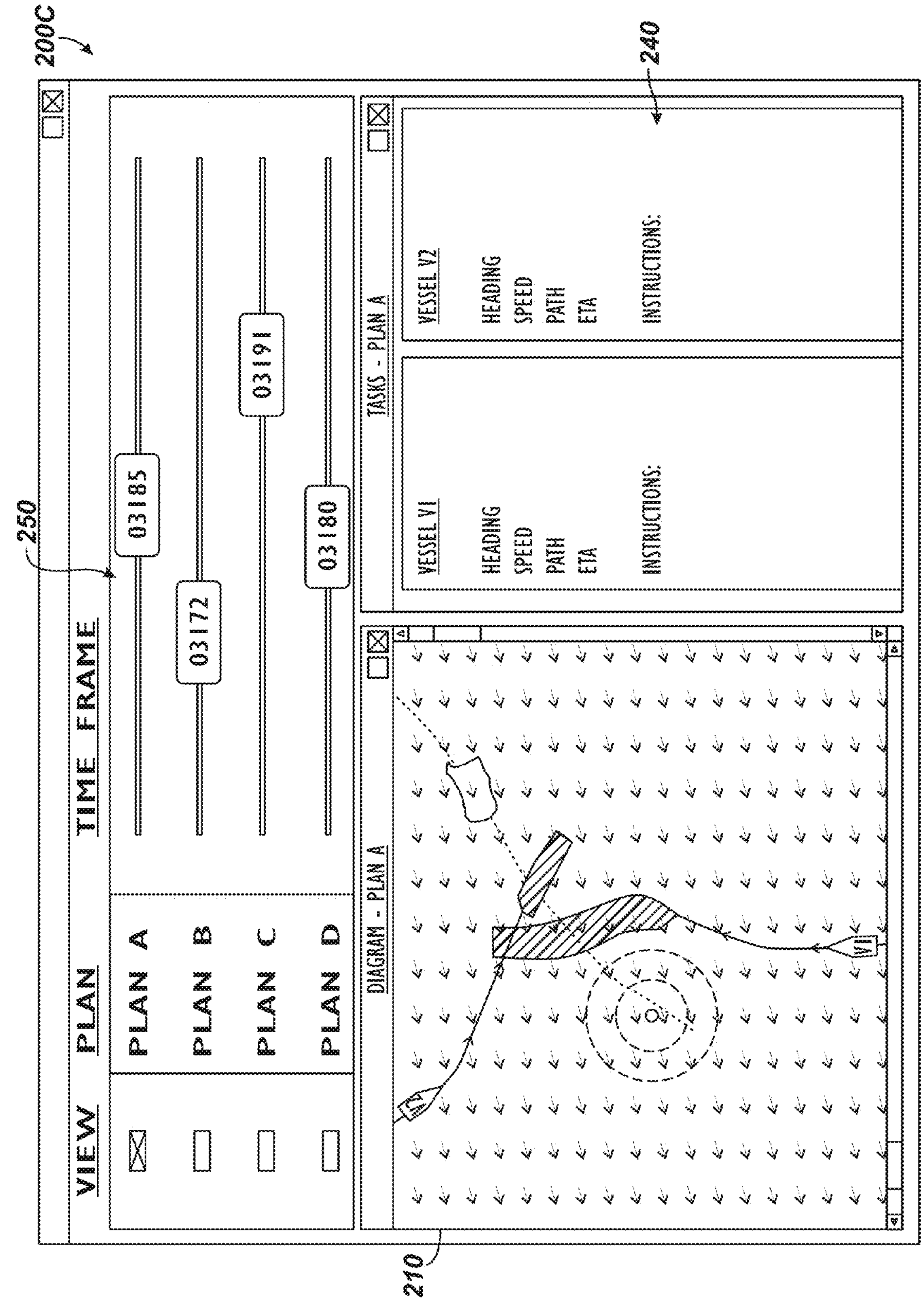

FIG. 7C shows another example of a user interface screen 200C for the system's planning tool (118). In addition to the features already described, the screen 200C shows predicted paths or programmed tracks of ice obstacles O, vessels 30, and the like and shows assignments of the various system resources. As noted previously, system operators can assign tasks to the support vessels 30, and support vessels 30 can assign tasks for themselves. Tasks include monitoring specific ice obstacles or taking action to divert a designated ice obstacle from its track. The system operators can use the screen 200C of the planning tool (118) to define a recommended path for a vessel 30 to steer and execute a specific task.

In the system's user interface screen 200C, for example, the operator can assign specific tasks 240 to any of the various support vessels 30. The tasks include instructions to physically observe an ice obstacle, to actively deviate specific ice obstacles to a different course, to perform a scouting and picket fence run, etc. Using a combination of available data and predictions, the operator can then decide what tasks, if any, need to be carried out. Tasks 240 will typically be assigned to support vessels 30 and include ice scouting, ice targeting, ice target monitoring, and ice target tagging. For ice scouting, the support vessel 30 can be assigned a general scouting role. The task could be for a defined area or vessel track, or it could simply be left to the discretion of the support vessel's captain.

For ice targeting, the support vessel 30 is assigned a specific ice obstacle O or area of ice to target, break, or deflect. For ice target monitoring, the support vessel 30 is assigned a specific ice obstacle to monitor so information can be input into the system 10. For ice target tagging, the support vessel 30 is assigned a specific ice obstacle to tag with GPS transponder beacons 40.

The disclosed system 10 can automatically calculate the suggested vessel's sail track T required to carry out a task starting from the current vessel position or from the end of a previous task. The disclosed system 10 also calculates the estimated time to travel between tasks.

The tasks 240 for the support vessels 30 appear in the disclosed system's user interface screens 200C so users can see at a glance the schedule of tasks 240, the estimated task times, and the estimated task durations for the support vessels 30. Another way to present tasks is shown in a user interface screen 200D of FIG. 7D, which has a calendar display 250. By querying time sliders in the calendar display 250, plans can be shown in a main viewing area 210 with the predicted tracks of identified ice obstacles and all planned vessel paths as they work through their tasks 240. Using the calendar display 250, the operator can coordinate and schedule the vessel tasks 240 in the most efficient and safest manner.

To make the calendar display 250, logged data (vessel positions, obstacle or transponder positions, ice image files, etc.) is tagged with timestamps so the information can be displayed spatially over time. The calendar display 250 also allows operator to define calendar events, such as support vessel 30 availability; scheduled downtime; scheduled importing of ice images, GPS transponder files, or other files; and identification of new obstacle threats.

By selecting a plan and dragging the mouse pointer across the plan's slider on the calendar display 250, for example, the operator can animate other displays, such as the main viewing area 210, over time. This time sliding allows the operator to visualize how the ice is moving over time and observe trends and potential threats to the target vessel 20. The operator can also see planned vessel 30 and predicted ice and obstacle movements to consider how the plan will work to reduce threats to the target vessel (20).

Although only some user interface screens for the system 10 have been shown in FIGS. 7A-7D, it will be appreciated that the user interfaces and various modules of the system 10 can use a number of screens for entering, modifying, and displaying information. For example, a user interface screen may be provided that allows operators to relay and communicate instructions between vessels, maintain action items, modify or configure the system, and the like.

The techniques of the present disclosure can be implemented in digital electronic circuitry, or in computer hardware, firmware, software, or in combinations of these. Apparatus for practicing the disclosed techniques can be implemented in a computer program product tangibly embodied in a machine-readable storage device for execution by a programmable processor; and method steps of the disclosed techniques can be performed by a programmable processor executing a program of instructions to perform functions of the disclosed techniques by operating on input data and generating output. Suitable processors include, by way of example, both general and special purpose microprocessors. Generally, the processor receives instructions and data from a read-only memory and/or a random access memory, including magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. As discussed previously, the disclosed system and methods can be used in icy regions having glacial ice, pack ice, ice floes, and other ice obstacles. However, the disclosed system and methods can be used in other locations having debris, plants, flotsam, jetsam, marine animals, or other obstructions or obstacles submerged and/or floating in the water that can interfere with drilling, production, or exploration operations. Therefore, the teachings of the present disclosure are not limited to use in only icy regions. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A marine threat monitoring method for a target marine structure, comprising:

identifying with a computer system one or more marine obstacles in a vicinity of the target marine structure as the target marine structure conducts set operations in a body of water;

monitoring with the computer system position of the one or more identified marine obstacles over time relative to the target marine structure;

predicting with the computer system a threat to the target marine structure based on the monitored position of the one or more identified marine obstacles;

determining with the computer system an attribute of the one or more marine obstacles of the threat;

comparing with the computer system the determined attribute to a structural limitation of the target marine structure, the structural limitation comprising a threshold of an impact sustainable by the target marine structure from the one or more marine obstacles, a time interval required to cease the set operations of the target marine structure, or a time interval required to move the target marine structure from the threat of the one or more marine obstacles; and planning with the computer system a response to the predicted threat to the target marine structure by the one or more identified marine obstacles based on the comparison.

2. The method of claim 1, wherein the marine obstacles includes an iceberg, ice floe, pack ice, debris, plants, flotsam, jetsam, floating obstacles, submerged obstacles, marine animals, fish schools, whale pods, or a combination thereof; and wherein the target marine structure is selected from the group consisting of a drilling structure, a drilling ship, a production structure, a production vessel, a production platform, a wellhead, a riser, an exploration structure, a seismic survey vessel.

3. The method of claim 1, wherein identifying with the computer system the one or more marine obstacles in the vicinity of the target marine structure comprises receiving location information from one or more beacons deployed on the one or more marine obstacles.

4. The method of claim 3, wherein monitoring with the computer system the position of the one or more identified marine obstacles over time relative to the target marine structure comprises determining the position of the one or more marine obstacles using the location information of the one or more deployed beacon over time.

5. The method of claim 1, wherein identifying with the computer system the one or more marine obstacles in the vicinity of the target marine structure comprises determining the one or more marine obstacles from imaging data of the vicinity of the target marine structure.

6. The method of claim 5, wherein monitoring with the computer system the position of the one or more identified marine obstacles over time relative to the target marine structure comprises determining movement of the one or more marine obstacles from the imaging data over time.

7. The method of claim 6, wherein identifying with the computer system the one or more marine obstacles in the vicinity of the target marine structure comprises manually entering observed data of the one or more marine obstacles.

8. The method of claim 1, wherein predicting with the computer system the threat to the target marine structure based on the monitored position of the one or more identified marine obstacles comprises determining a future track of the one or more marine obstacles of the threat relative to the target marine structure.

9. The method of claim 1, wherein the attribute is selected from the group consisting of size, distance, speed, shape, depth, track, and threat level.

10. The method of claim 1, wherein planning with the computer system the response to the predicted threat comprises planning deployment of at least one resource in response to the predicted threat.

11. The method of claim 10, wherein planning deployment of the at least one resource comprises diverting the one or more marine obstacles of the threat by directing one or more vessels relative to the one or more marine obstacles of the threat.

12. The method of claim 11, wherein diverting the one or more marine obstacles of the threat comprises breaking or moving the one or more marine obstacles with the one or more vessels.

13. The method of claim 10, wherein planning deployment of the at least one resource comprises tracking positions of one or more vessels relative to the one or more marine obstacles and the target marine structure.

14. The method of claim 10, wherein the at least one resource is selected from the group consisting of a support vessel, a tracking beacon, an aircraft, and a remotely operated vehicle.

15. The method of claim 1, wherein planning with the computer system the response to the predicted threat comprises generating a task for observing, diverting, or tagging the one or more marine obstacles.

16. The method of claim 15, wherein generating the task for observing, diverting, or tagging the one or more marine obstacles comprises sending an instruction to at least one resource to implement the generated task.

17. The method of claim 1, wherein planning with the computer system the response to the predicted threat comprises determining a time interval in which to shut down the set operations and move the target marine structure from the predicted threat.

18. A programmable storage device having program instructions stored thereon for causing a programmable control device to perform a marine threat monitoring method for a target marine structure, the method comprising:

identifying one or more marine obstacles in a vicinity of the target marine structure as the target marine structure conducts set operations in a body of water;

monitoring position of the one or more identified marine obstacles over time relative to the target marine structure;

predicting a threat to the target marine structure based on the monitored position of the one or more identified marine obstacles;

determining an attribute of the one or more marine obstacles of the threat;

comparing the determined attribute to a structural limitation of the target marine structure, the structural limitation comprising a threshold of an impact sustainable by the target marine structure from the one or more marine obstacles, a time interval required to cease the set operations of the target marine structure, or a time interval required to move the target marine structure from the threat of the one or more marine obstacles; and planning a response to the predicted threat to the target marine structure by the one or more identified marine obstacles based on the comparison.

19. A marine threat monitoring system of a target marine structure, comprising:

communication equipment obtaining information about one or more marine obstacles in a vicinity of the target marine structure;

memory storing the obtained information; and one or more servers operatively coupled to the communication equipment and the memory, the one or more servers being configured to:

identify the one or more marine obstacles as the target marine structure conducts set operations in a body of water, monitor position of the one or more identified marine obstacles over time relative to the target marine structure, predict a threat to the target marine structure based on the monitored position of the one or more identified marine obstacles, determine an attribute of the one or more marine obstacles of the threat, compare the determined attribute to a structural limitation of the target marine structure, the structural limitation comprising a threshold of an impact sustainable by the target marine structure from the one or more marine obstacles, a time interval required to cease the set operations of the target marine structure, or a time interval required to move the target marine structure from the threat of the one or more marine obstacles, and plan a response to the predicted threat based on the comparison.

* * * * *